Aug. 18, 1953  C. V. W. BROWN  2,648,844
ANTIGLARE EYESHADE
Filed Nov. 29, 1947  3 Sheets-Sheet 1

INVENTOR
CHARLES V. W. BROWN
BY
DesJardins & Compton
HIS ATTORNEYS

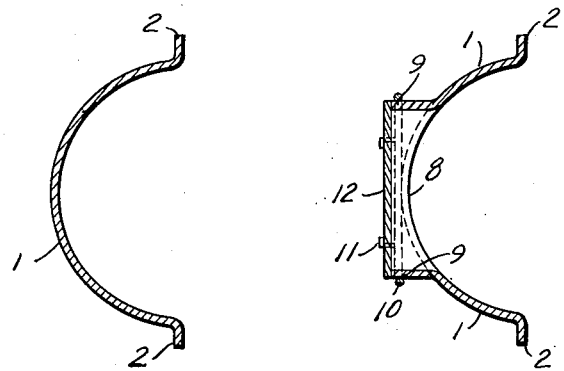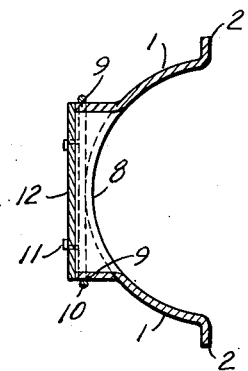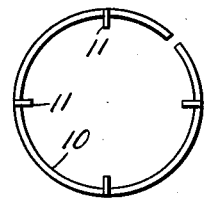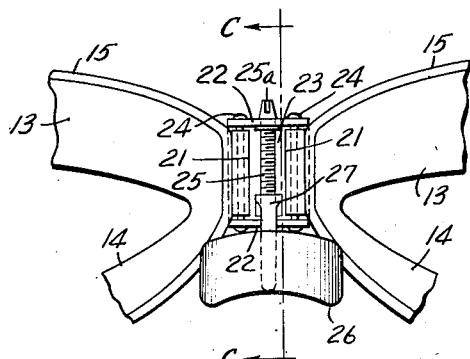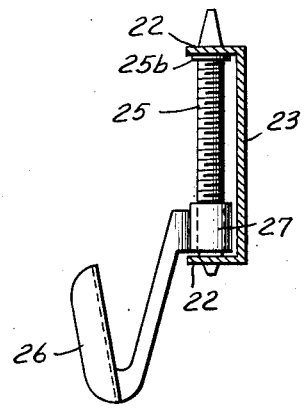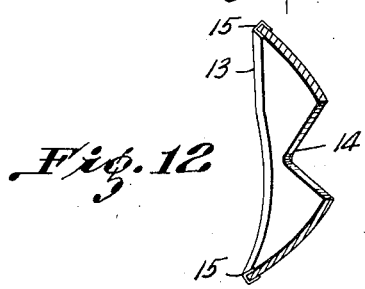

Aug. 18, 1953  C. V. W. BROWN  2,648,844
ANTIGLARE EYESHADE
Filed Nov. 29, 1947  3 Sheets-Sheet 3
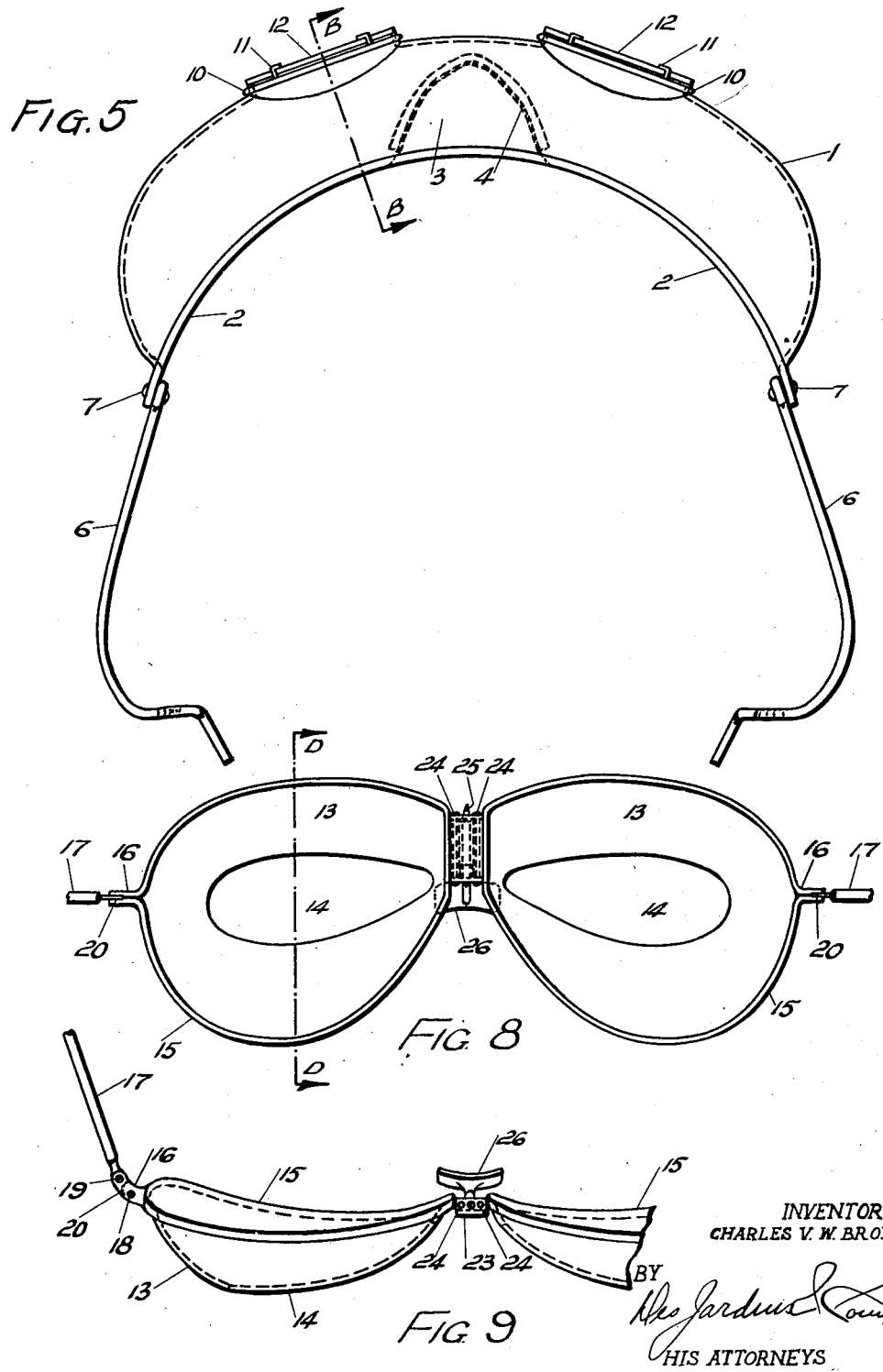
INVENTOR
CHARLES V. W. BROWN
HIS ATTORNEYS Patented Aug. 18, 1953

2,648,844

UNITED STATES PATENT OFFICE 2,648,844

ANTIGLARE EYESHADE

Charles V. Watson Brown, Brisbane, Queensland, Australia

Application November 29, 1947, Serial No. 788,844
In Australia January 13, 1947

5 Claims. (Cl. 2—14)

It has been realized that anti-glare or polarized spectacles as used for example by air-crews, mariners and observation personnel and such like persons, are not entirely satisfactory. Although they shade the eyes from direct rays of light they do not divert the scattered rays coming from other directions. In practice it is found such spectacles diminish visual acuity, and cause momentary upset in accommodation when they are removed.

The object of this invention is to provide a device which will place the eyes in complete shade; will at the same time give normal or increased visual acuity; will remove rays reflected from cloud banks and water surfaces; will remove scattered lateral rays; and will be light, comfortable and easily maintained in position on the wearer. A further object is to provide a device which will protect the eyes of industrial workers, for example workers engaged in grinding and similar processes associated with high speed wheels and the like, furnace attendants and men employed in all smelting operations. Other objects will be apparent from the following description.

The invention will be fully understood from the following description taken in connection with the accompanying drawings wherein:

Figure 3 is a section on the line A—A of Figure 1;

Figures 4 and 5 are respectively rear elevation and plan of a modified form of the invention adapted for use by industrial workers;

Figure 6 is a section on the line B—B of Figure 5;

Figure 7 is an elevation of the lens retaining ring;

Figures 8 and 9 are respectively front elevation and plan of a further modified form of the invention adapted for use by the public;

Figure 10 is an enlarged fragmentary rear elevation of Figure 8 showing the bridge;

Figure 11 is a section on the line C—C of Figure 10; and

Figure 12 is a section on the line D—D of Figure 8.

Figure 1:
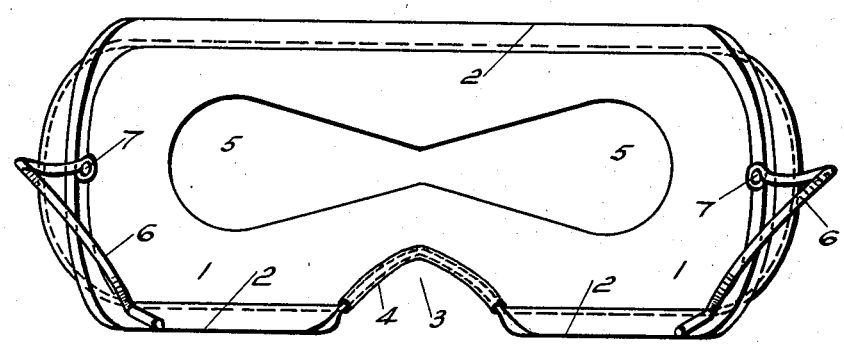
Figures 1 and 2 are respectively rear elevation and plan of the invention adapted for observation purposes.
Figure 2:
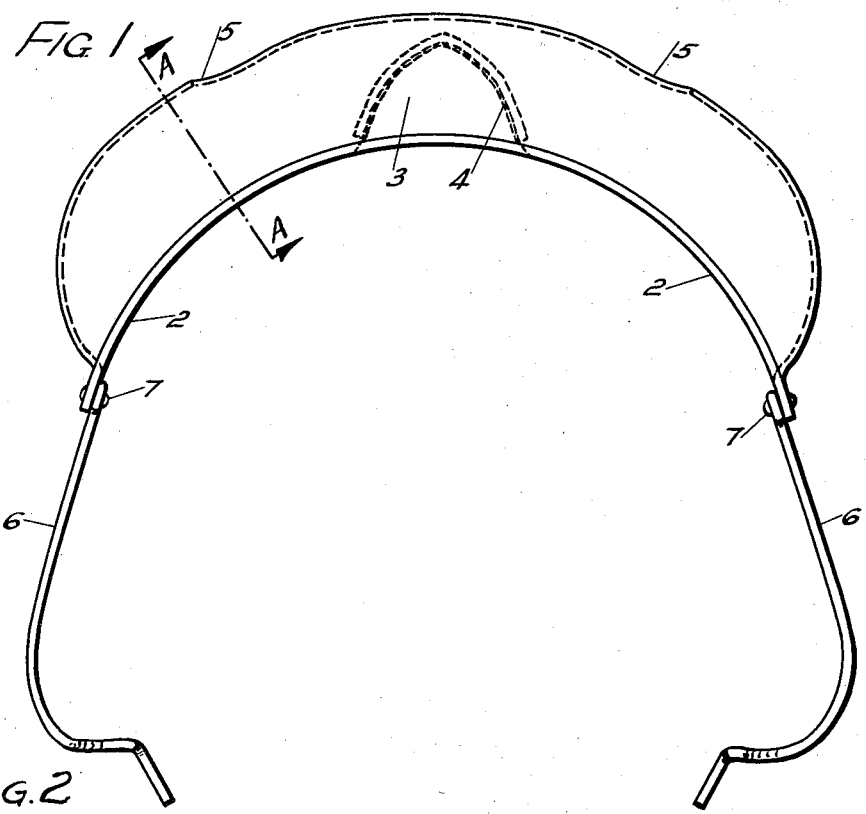

Referring to Figures 1 to 3 a shell 1, of tinted (preferably green) Celluloid or material of a similar character, is moulded or otherwise formed to have somewhat semicircular horizontal and centre vertical cross sections. Glass or a similar material may be used to form said shell 1 but is undesirable due to its tendency to shatter when knocked. The rim 2 of said shell is shaped to conform to the normal contour of the forehead, temples, bridge of the nose and cheeks, whilst a V-shaped recess 3 is provided in the lower rim 2 to fit over the nose. Preferably a piece of split rubber tube 4, or the like, is glued around said recess 3 to form a comfortable dustproof rest over the nose. Two tear shaped apertures 5, in line across with their thinner ends merging at the centre, are provided in the bulge of said shell 1 directly in front of the wearer's eyes. Wires 6, preferably flexible, are provided at the ends of said shell 1 and are secured to rim 2 by rivets 7. Said wires 6 are shaped to hook over the ears of the wearer and thus maintain shell 1 in the correct attitude.

Although the invention is primarily adapted for use without spectacles, the bulged shell will accommodate spectacles if necessary. It is not generally intended that there shall be glass or other transparent windows in the apertures, but such could be provided if required for special purposes. For example the invention may be usefully employed during the treatment of ophthalmia where glare is to be avoided. Where children are being treated it may be found very desirable to incorporate windows to prevent ingress of flies likely to gather and distribute infection. In a modification flat sections may be provided which are clear or faintly tinted in the bulged shell in front of the eyes, such sections being formed during the moulding of the said shell.

Tests carried out with shades made according to this invention have shown that, (a) The shades give full visual acuity, there being no limitation in the acuity of direct vision. The fields of vision are diminished slightly by the material used, but this is only comparable to the diminution of acuity evident in Polaroid spectacles.

(b) Direct vision is increased in acuity. The shade actually acts as a stenopoeic lens, and the normal visual acuity of 6/9 is increased to 6/6.

(c) The eyes are in complete shade. Tests carried out show the eyes in ordinary glare experience 55 foot candles, whilst with the shade attached, they experience 12 foot candles.

(d) Those rays which are reflected from the surface of the water, ground, cloud or the like are prevented from being directed to the eyes by the lower surface of the shade.

(e) The scattered rays from lateral, medial and upper directions are prevented from entering the eyes by the surrounding close-fitting surfaces of the shade in those positions.

The invention may be applied as a peak of a cap or the like or an integral part of other headwear used by persons requiring protection from glare.

Figure 4:
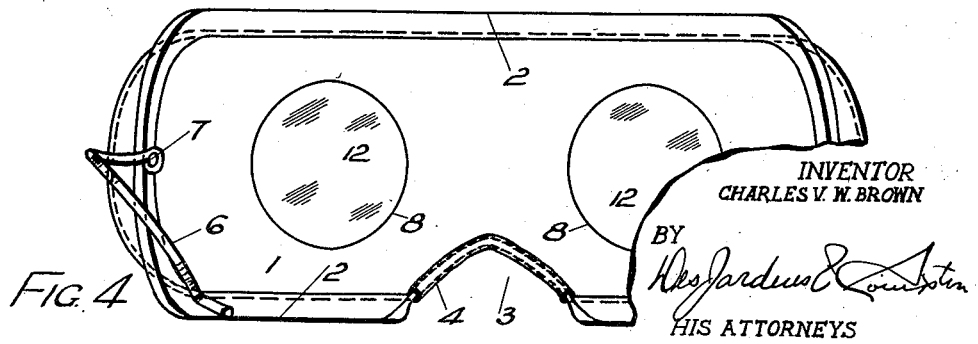

In a modified form (as suitable for industrial purposes) in lieu of apertures 5, two circular, outwardly flanged openings 8 are provided in the bulge of said shell 1 (see Figures 4 to 6). Said openings 8 are located directly in front of the wearer's eyes and, around their outsides, are provided with a groove 9 adapted to locate a split spring clip ring 10 (see Figure 7). Said ring 10 has a series of right angled lugs 11 which firmly grip and locate a disc 12 of tinted or clear glass over opening 8.

In this form the invention is adapted particularly for use by industrial workers whose eyes require protection from furnace glare and heat, and from hot flying particles from grinding wheels and the like. When discs 12 have become marked by flying particles and the like new discs can speedily be substituted by means of spring rings 10.

In a further modified form (see Figures 8 to 12) the invention is adapted for general use as an anti-glare eye shade against the sun. In lieu of one shell 1 as hereinbefore described two dished or bulged shells 13 are provided. A tear shaped aperture 14 is cut in each shell 13 at the centre of the bulge. The edge of each shell 13 is bound by a metallic channel frame 15 (see Figure 12) which fits snugly over the eyebrows, cheeks and around the eyes of the wearer. At the outer end of each shell 13 the ends of frame 15 are flattened at 16 to form an attachment for hooked wires 17 which hold the glasses in position on the wearer. Rivet 18 clamps said frame 15 about shell 13 and screw 19 permits hinged movement of wire 17. Lug 20 integral with wire 17 restricts the outward swing of wire 17 and mates with a step formed as the frame 15 is flattened at 16.

At the inner end of each shell 13 the frame 15 has a boss 21 affixed to it. Said bosses 21 fit freely between the flanges 22 and metallic channel section bracket 23 and are held therein by rivets 24. In line with said rivets 24 and on the centre line of said bracket 23 a threaded spindle 25 carries a bridge 26 attached to said spindle 25 by threaded boss 27. A slot 25a is provided in the head of spindle 25 for adjusting the height of bridge 26 and a shoulder 25b holds spindle 25 in position in bracket 23.

It will be understood that because of the double hinge at the bridge 26 and the hinged connection of the wires 17 the glasses may be folded into a compact shape for carrying in a suitable pouch in the wearer's pocket. The shells 13 are large enough to fit over the wearer's glasses if need be and the bridge 26 can be adjusted to the most comfortable position on the wearer's nose.

I claim:

1. An improved anti-glare eye shade comprising a bulged concavo-convex shell of transparent rigid material shaped at its rim to conform to the normal contour of the forehead, temples, bridge of the nose, and cheeks, and characterized in that an aperture or apertures is or are provided in said shell in line with the eyes of the wearer, and a transparent protector material readily detachably secured in said aperture or apertures.

2. An improved anti-glare eye shade as set forth in claim 1 having a flange adjacent the clear, open section or sections.

3. An improved anti-glare eye shade as set forth in claim 1 having a flange adjacent the aperture or apertures, and readily detachable means for attaching transparent protector covering material over the aperture or apertures.

4. An improved anti-glare eye shade as set forth in claim 3, including a readily detachable slip ring fitted to the flange and adapted to hold the protective covering over the aperture.

5. An improved anti-glare eye shade as set forth in claim 4 in which the readily detachable slip ring is provided with lugs to overhang the aperture protective covering.

C. V. WATSON BROWN.

References Cited in the file of this patent

UNITED STATES PATENTS

| Number | Name | Date |
|---|---|---|
| 916,109 | Cook | Mar. 23, 1909 |
| 1,043,270 | Stevens | Nov. 5, 1912 |
| 1,286,645 | Jacobs | Dec. 3, 1918 |
| 1,712,360 | Slaughter | May 7, 1929 |
| 2,007,186 | Farrell | July 9, 1935 |